US007043808B2

(12) United States Patent
Patton

(10) Patent No.: US 7,043,808 B2
(45) Date of Patent: May 16, 2006

(54) TOOL FOR INSTALLING BLIND THREADED FASTENERS

(75) Inventor: Roger B. Patton, North Wales, PA (US)

(73) Assignee: PEM Management, Inc., Wilmington, DE (US)

( * ) Notice: Subject to any disclaimer, the term of this patent is extended or adjusted under 35 U.S.C. 154(b) by 189 days.

(21) Appl. No.: 10/813,046

(22) Filed: Mar. 31, 2004

(65) Prior Publication Data

US 2004/0216292 A1 Nov. 4, 2004

Related U.S. Application Data

(60) Provisional application No. 60/466,465, filed on Apr. 30, 2003.

(51) Int. Cl.
*B23P 19/04* (2006.01)

(52) U.S. Cl. .......................................... 29/252

(58) Field of Classification Search ................. 29/252, 29/255, 278, 263, 267, 270
See application file for complete search history.

(56) References Cited

U.S. PATENT DOCUMENTS

| 2,325,508 | A |   | 7/1943  | Haas et al.          |
| 3,164,283 | A | * | 1/1965  | Olson ........ 29/243.523 |
| 3,791,011 | A | * | 2/1974  | Keys ............ 29/252 |
| 4,213,239 | A | * | 7/1980  | Filer ............. 29/726 |
| 5,281,059 | A |   | 1/1994  | Stuckle |
| 5,323,946 | A |   | 6/1994  | OConnor et al. |
| 5,661,887 | A |   | 9/1997  | Byrne et al. |
| 5,666,710 | A |   | 9/1997  | Weber et al. |
| 6,182,345 | B1 |  | 2/2001  | Travis |
| 2004/0216292 | A1 | * | 11/2004 | Patton ............ 29/252 |

* cited by examiner

*Primary Examiner*—Lee D. Wilson
(74) *Attorney, Agent, or Firm*—Gregory J. Gore

(57) ABSTRACT

A tool for installing blind threaded inserts utilizes an expanding mandrel to engage the threads of the insert being installed. The expanding mandrel is an externally threaded assembly having a plurality of movable segments separated by axially-extending radial slots. The slot width is chosen such that when the mandrel is in a collapsed state the external diameter of the mandrel will pass through the minor diameter of the insert's internal thread. The segments are movable radially between a collapsed state, the condition of the mandrel segments when they are in their inward most position of minimum diameter, and an expanded state, when the mandrel segments are moved outwardly to their position of maximum diameter. The mandrel of the invention also extends and retracts axially to compress and thereby install the deformable insert.

14 Claims, 9 Drawing Sheets

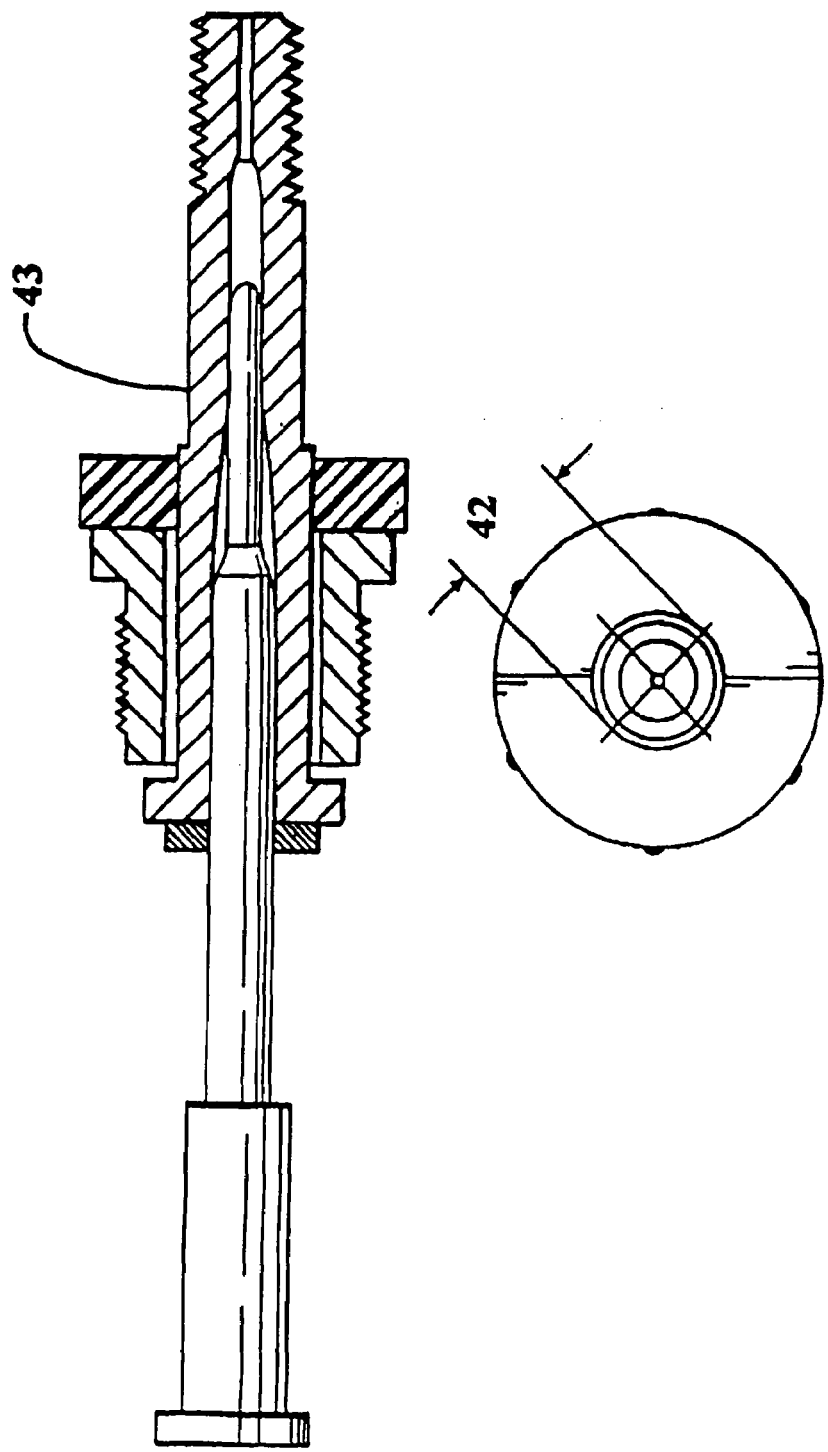

TOOL FOR INSTALLING BLIND THREADED FASTENERS

RELATED APPLICATIONS

The present application is related to provisional patent application ser. No. 60/466,465 entitled "Tool for Installing Blind Threaded Fasteners" filed on Apr. 30, 2003, priority from which is hereby claimed.

FIELD OF THE INVENTION

This invention relates to a tool for the installation of blind threaded fasteners. More specifically, it relates to tools which include a radially-expansive shaft for gripping parts on which it operates.

BACKGROUND OF THE INVENTION

Blind threaded fasteners are fasteners, either internally or externally threaded, that can be first installed into a hole in a panel with access to one side of the panel only, hence the term "blind". Most of these fasteners contain three basic components: a head, an intermediate collapsible thin-walled counterbored portion of the shank, and an internally threaded region at the end. Typically the threaded area and a portion of the shank are first installed into the hole and then a compressive force is applied to the shank by pulling on the threaded region while supporting the head. This compression causes the shank to buckle outwardly, creating what is known as a "bulb" on the side of the sheet opposite the head. The threaded tool member used to compress the shank is then removed, leaving the fastener permanently gripped to the panel and restrained by the head in one direction and the bulb in the opposite direction.

Presently available tools for applying the compressive load (upset force) to collapse the shank can be divided into two broad categories, spin-spin and spin-pull types. Both types of tools utilize an anvil, also known as a nosepiece, from which the mandrel projects. Its function is to support the head of the fastener while the mandrel retracts or spins to force the insert toward the anvil. Spin-spin tools apply the compressive load to the shank by applying enough torque to a mandrel threaded into the fastener to produce the required load. Spin-spin tools are inexpensive, lightweight and simple to set up and use and are therefore generally preferred. However, because the upset force they can develop is limited, they generally cannot be used to install parts having thicker walls. Spin-pull tools spin the mating threaded member into position, then apply an axial pulling force by retracting the mandrel. The mandrel is then removed by spinning it in the opposite direction. Spin-pull tools are more complex and consequently more expensive and heavier than spin-spin tools. They are also more difficult to set up and require more maintenance. In spite of these disadvantages, spin-pull tools are the best available choice for thick-walled parts requiring higher compressive loads to form the bulb.

Spin-spin tools of the existing art are rather simple devices powered by a reversible motor, pneumatic or electric. A transmission of some sort is typically used to reduce speed and increase torque. The transmission output is connected to a threaded mandrel. The mandrel is supported axially by a thrust bearing and radially by a close fit in a nosepiece. The nosepiece supports the head of the insert when the compressive load is applied. Serrations are applied to the end of the nosepiece to prevent the insert from rotating when the mandrel is tightened.

A spin-spin tool operates as follows. An insert is first threaded onto the mandrel. This can be done either manually or the tool can be rotationally jogged in the forward direction. Regardless of whether the insert is threaded on manually or by using tool power, it must be installed until the head is just in contact with the serrated anvil. The next step is to install the body of the fastener into the hole in the panel into which it will be installed. It must be installed fully so that the underside of the head is in intimate contact with the outer surface of the panel. The tool is then activated in the forward direction and as the tool rotates, a compressive load is produced causing the fastener to form a bulb on the back side of the work piece until the tool stalls. The torque at which the tool stalls is controlled by a parameter that was adjusted during the set-up process. If the torque has been properly set it will induce enough load to properly form the bulb on the fastener but not be so great as to damage the fastener. To complete the cycle, the trigger is actuated in the reverse direction to unthread the mandrel from the installed insert.

Spin-pull tools of the existing art have two major components, those which produce the spinning action and those which produce the pulling action. The spinning action is provided by a reversible pneumatic or electric motor. Unless used to create the pulling force, motors are typically smaller than those used on spin-spin tools, because less torque is required.

Spin-pull tools operate as follows. First the tool mandrel is threaded into the insert. After the insert has been fitted to the mandrel, the body of the insert is installed into the hole in the panel into which it is to be installed. It must be installed fully so that the underside of the head is in intimate contact with the outer surface of the panel. After the insert is installed the pulling motion of the tool is initiated by the operator squeezing a trigger. Depending on the design of the tool the pulling motion continues until either a preset distance or a preset force has been achieved. The pulling motion will cause the fastener to bulb completely. After the pulling motion is complete, the mandrel spins in the reverse direction unthreading it from the fastener. Depending on the style of tool, this reverse rotation is either initiated by the operator squeezing a trigger or by the tool sensing the completion of the pulling motion. After the mandrel spins out of the installed insert, the tool is ready for the next cycle.

Both types of tools of the existing art use a conventional threaded mandrel to engage the threads of the insert. This member needs to be started, essentially meaning its helix needs to be aligned with the helix of the insert thread. This helix alignment is complicated by the fact that most internally threaded inserts have two separate helical grooves. One is the actual thread, which is the one that needs to be aligned with the mandrel thread. The second is of smaller size, is one half turn from the true thread, and is created at the minor diameter by the way in which the insert material flows during the form tapping operation. Many internally threaded blind inserts are form tapped for increased thread strength compared to cut tapping. If the mandrel thread starts into the smaller diameter helix at the minor diameter, it will bind after a very short amount of rotation. Even if the mandrel is started properly, time is required to thread the mandrel in and then unthread it at the end of the cycle. If one assumes a rotational speed of 1500 RPM and 10 threads engaged, the total in and out time is 0.8 seconds plus the time required for the motor to accelerate to rated speed. If an additional 0.2 seconds is estimated for the two accelerations, the total time becomes 1.0 second. For high volume applications, user expectations are currently for a 5.0 second total cycle time, in which case the non-productive thread in and thread out time is 20 percent of the total.

It is, therefore, an objective of this invention to provide an installation tool for blind-threaded inserts with force capability equal to or greater than that of existing spin-pull tools which makes it simpler to set up and use than existing spin-spin tools. It is a further objective of this invention to eliminate the problems of cross-threading and mandrel wear and to reduce the time required to engage and disengage the threaded member of the tool from the insert threads.

SUMMARY OF THE INVENTION

In order to solve the problems in the art described above, an expanding mandrel replaces the conventional solid, threaded member to engage the threads of the insert being installed. The expanding mandrel is an externally threaded assembly having a plurality of movable segments separated by axially-extending radial slots. The segments are movable radially between a collapsed state, the condition of the mandrel segments when they are in their inward most position of minimum diameter, and an expanded state, when the mandrel segments are moved outwardly to their position of maximum diameter. The slot width is chosen such that when the mandrel is in a collapsed state the external diameter of the mandrel will pass through the minor diameter of the insert's internal thread. Like a spin-pull tool, the mandrel of the invention also extends and retracts axially, the extended position being the position of maximum extension of the mandrel from the face of the insert head support member or anvil and the retracted state being the position of the mandrel at the point of minimum protrusion from the face of the anvil.

The present device is a tool for installing blind threaded fasteners, comprising the following basic elements.

1) A mandrel rod including thread-like grooves comprised of multiple segments with specified design criteria in each of two positions, collapsed and expanded. In the collapsed position the effective outer diameter of the unit is slightly smaller than the minimum minor diameter of the corresponding size internal thread. In the expanded position the outer surface of the unit lies essentially within the limits of size of the desired size of external thread.
2) Means to resist radially inward motion and further to lock the mandrel rod in the expanded position.
3) Means to move the mandrel rod between the collapsed state and the expanded state.
4) Means to support the head of the fastener during the installation process.
5) Means to move the mandrel rod axially forward and backward relative to the anvil.
6) Means to adjust the axial position of the anvil relative to the mandrel when it is in its fully extended position.

The operation of a hand tool constructed according to the present invention begins with the mandrel in the radially-collapsed and axially-extended state. The operator first inserts the mandrel into the insert and the tool is actuated to expand the mandrel segments against the internal threads of the insert thereby attaching the insert to the mandrel. The insert and tool are then placed into the workpiece mounting hole. Next, the tool is actuated by the operator to pull the mandrel into the nosepiece thus placing the insert in compression against the nosepiece anvil and causing it to bulb thereby gripping the insert to the workpiece. The mandrel is then returned to its collapsed state and the operator extracts the tool mandrel from the installed insert. Finally, the tool is actuated to return the mandrel to its extended state thereby completing the process.

The present invention offers at least three advantages over existing tools of this type. First, it provides faster cycle times by eliminating the need to thread the mandrel into the part and unthread the mandrel from the part during each cycle as is required with existing tools. Secondly, it allows automatic feeding of fasteners onto the mandrel without the need to thread the mandrel into the part. And lastly, potential problems with cross-threading are eliminated because the mandrel does not need to be rotatively threaded into the part. Other objects and advantages will be apparent to those of skill in the art from the following drawings and detailed description of the preferred embodiment.

DESCRIPTION OF THE DRAWINGS

FIG. 2 is a partially cross-sectioned side view of the mandrel in the radially collapsed state.

FIG. 3 is an end view of the mandrel in the radially collapsed state.

DESCRIPTION OF THE PREFERRED EMBODIMENT

Figure 1:
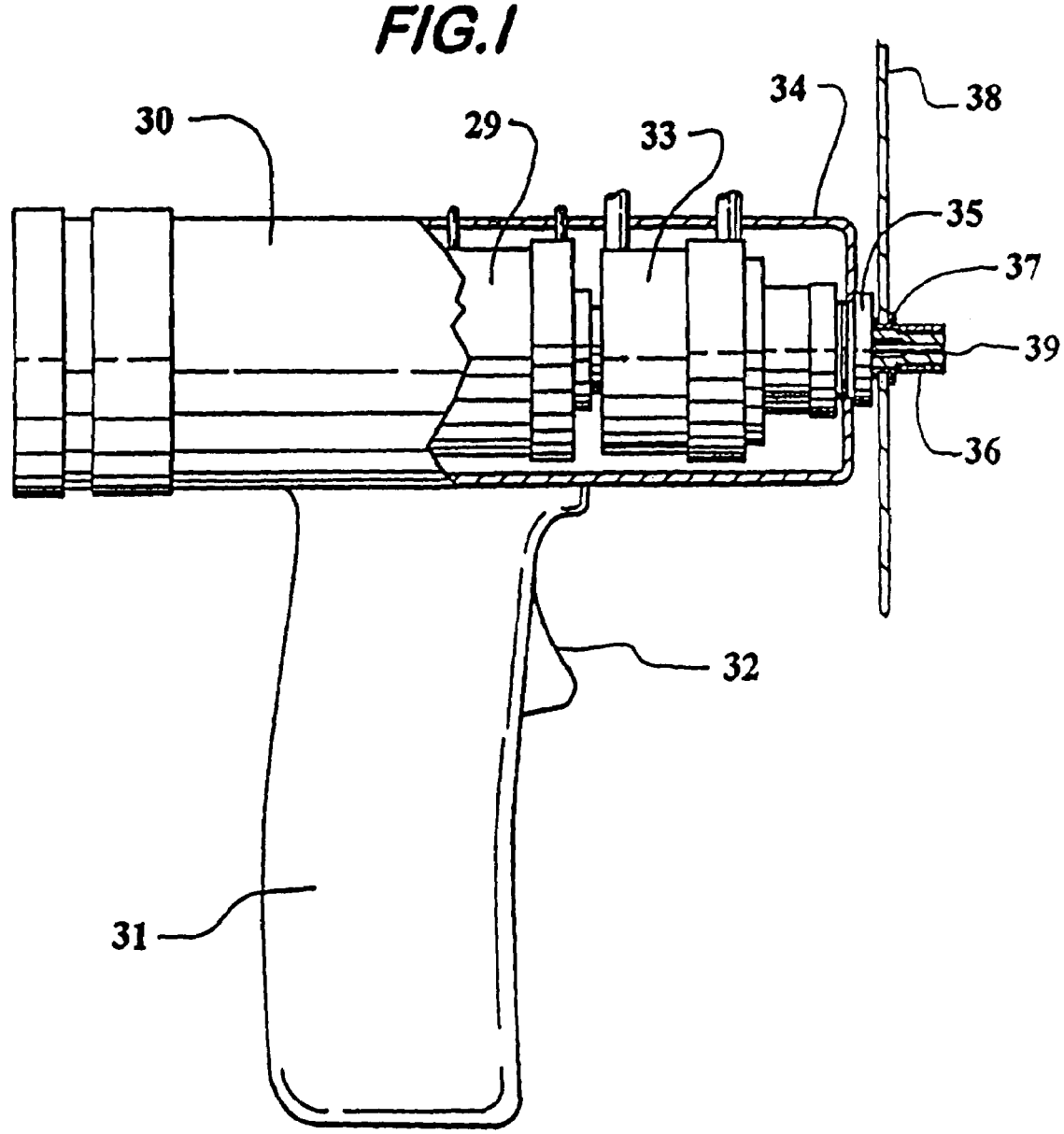
FIG. 1 is a partial cut-away side view of the invention in its operative position with a panel and a fastener just installed.
Figure 4:
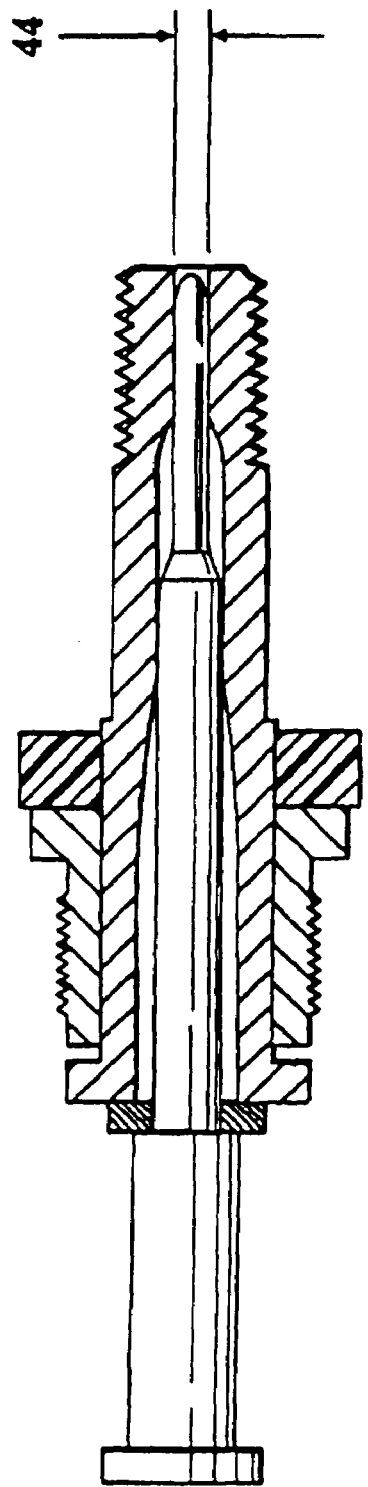
FIG. 4 is a partially cross-sectioned side view of the mandrel in the radially expanded state.
Figure 5:
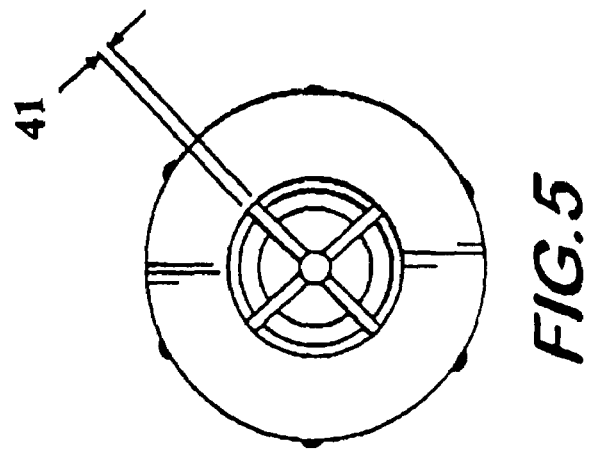
FIG. 5 is an end view of the mandrel in the radially expanded state.

Referring to FIG. 1, an overall view of the installation tool of the invention is shown positioned against the panel with an insert engaged with the expanding mandrel ready to be installed. While the invention is suitable for use with a robotic device, this embodiment is depicted in the form of a hand tool having a body 30, a handle 31, and rocker-type on/off switch 32. As will be more fully described below, the novel expanding mandrel includes a spreading pin 39 operated by hydraulic cylinder 29. Pneumatic cylinder 33 provides the pull force to compress the insert 36. The tool includes a forwardly-extending nosepiece 34 having an insert head support anvil 35 that abuts the head of the insert 36 during installation. In this figure, the insert has just been installed and a bulb 37 has formed on the insert against the backside of panel 38.

Details of the expanding mandrel construction can be understood with reference to FIGS. 2 through 5. The mandrel slot width 41 is chosen such that the maximum effective diameter in the collapsed position 42 shown in FIG. 3 is just under the minimum minor diameter of the internal thread. The weakest cross-section of the mandrel segment is in the threaded area. The unthreaded section of the mandrel is designed so that the wall thickness 43 in the unthreaded area is always greater than in the threaded area to preserve maximum tensile strength of the mandrel segments. Consideration is also given to the minimum diameter of the spreading pin 44 so that it will not fail in compression.

Figure 6:
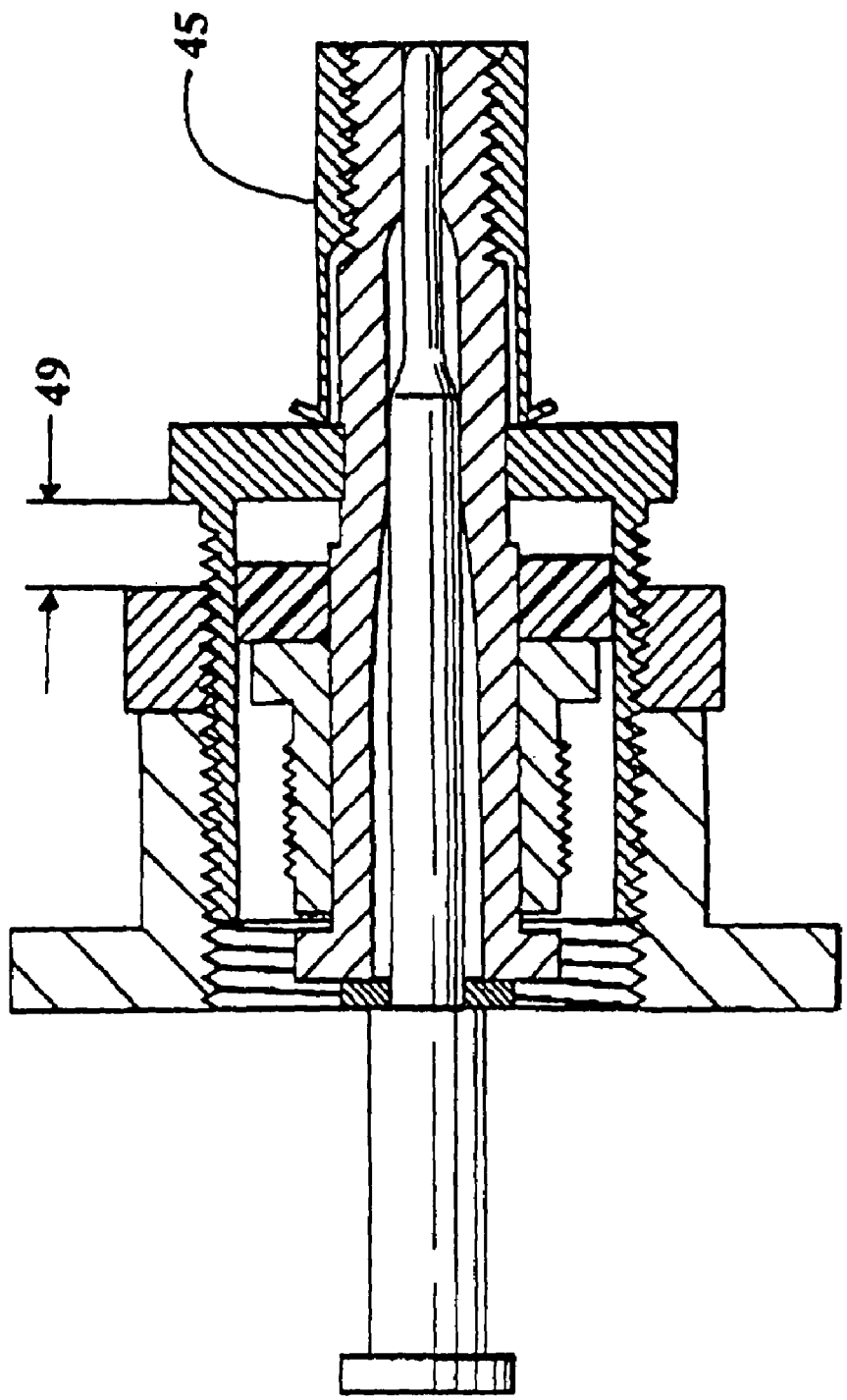
FIG. 6 is a partially cross-sectioned side view of the mandrel and nosepiece in the fully extended position for an insert of a given grip length.
Figure 7:
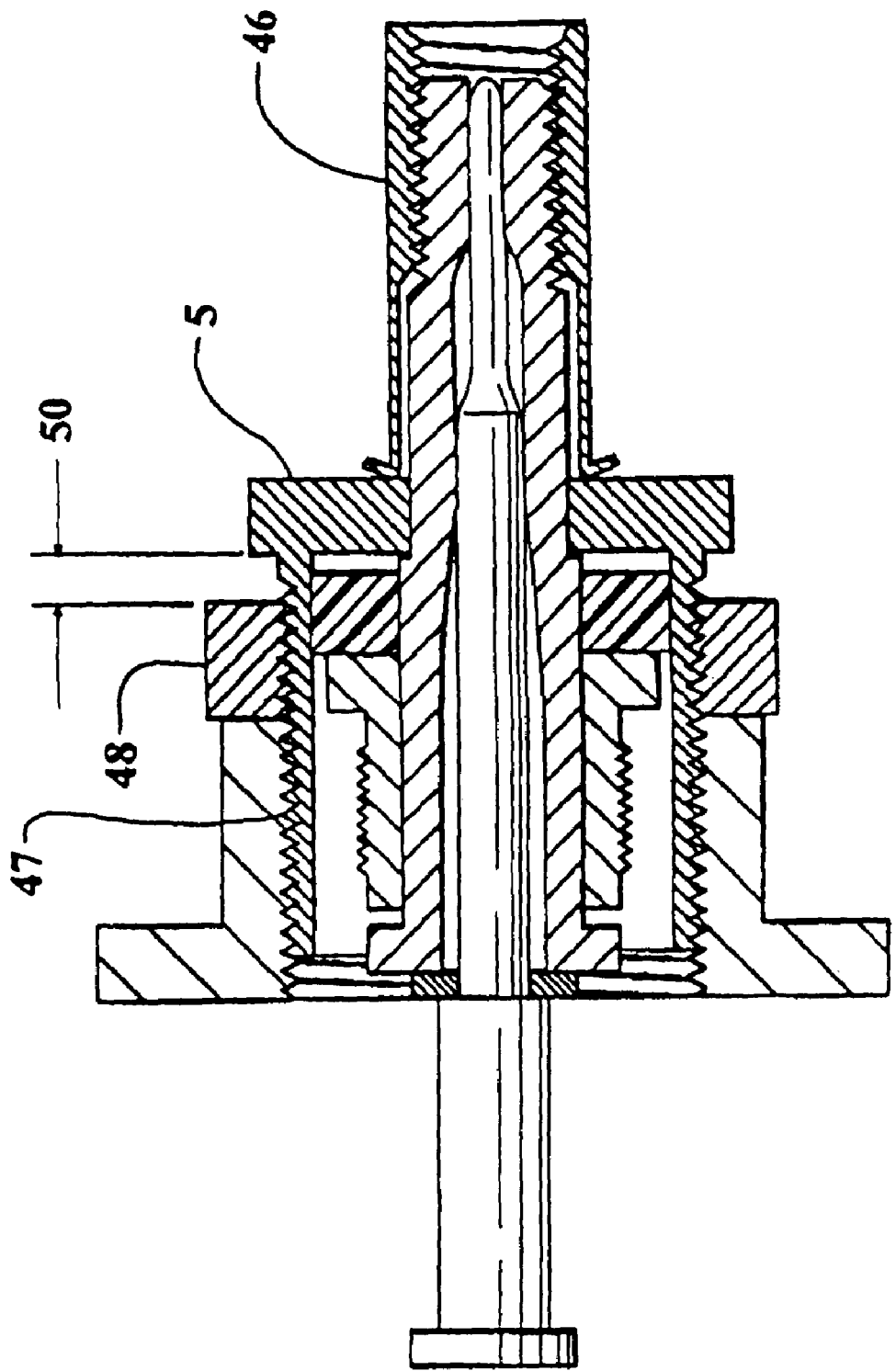
FIG. 7 is a partially cross-sectioned side view of the mandrel and nosepiece in the fully extended position for an insert of a different, longer grip than shown in FIG. 6.

Details of the head support anvil and the means used to adjust its axial position relative to the expanding mandrel assembly can be understood with reference to FIGS. 6 and 7. The insert 45 shown in FIG. 6 is designed for a shorter grip and therefore has a shorter counterbore than the insert 46 shown in FIG. 7. For full thread engagement, the expanding mandrel therefore needs to project farther from the face of head support anvil 5 for the insert 46 with the longer counterbore than for insert 45 shown in FIG. 6. This is accomplished by providing the anvil with a threaded adjustment means 47 and jam nut 48. Note the difference between the gap 49 in FIG. 6 and the gap 50 in FIG. 7.

Figure 8:
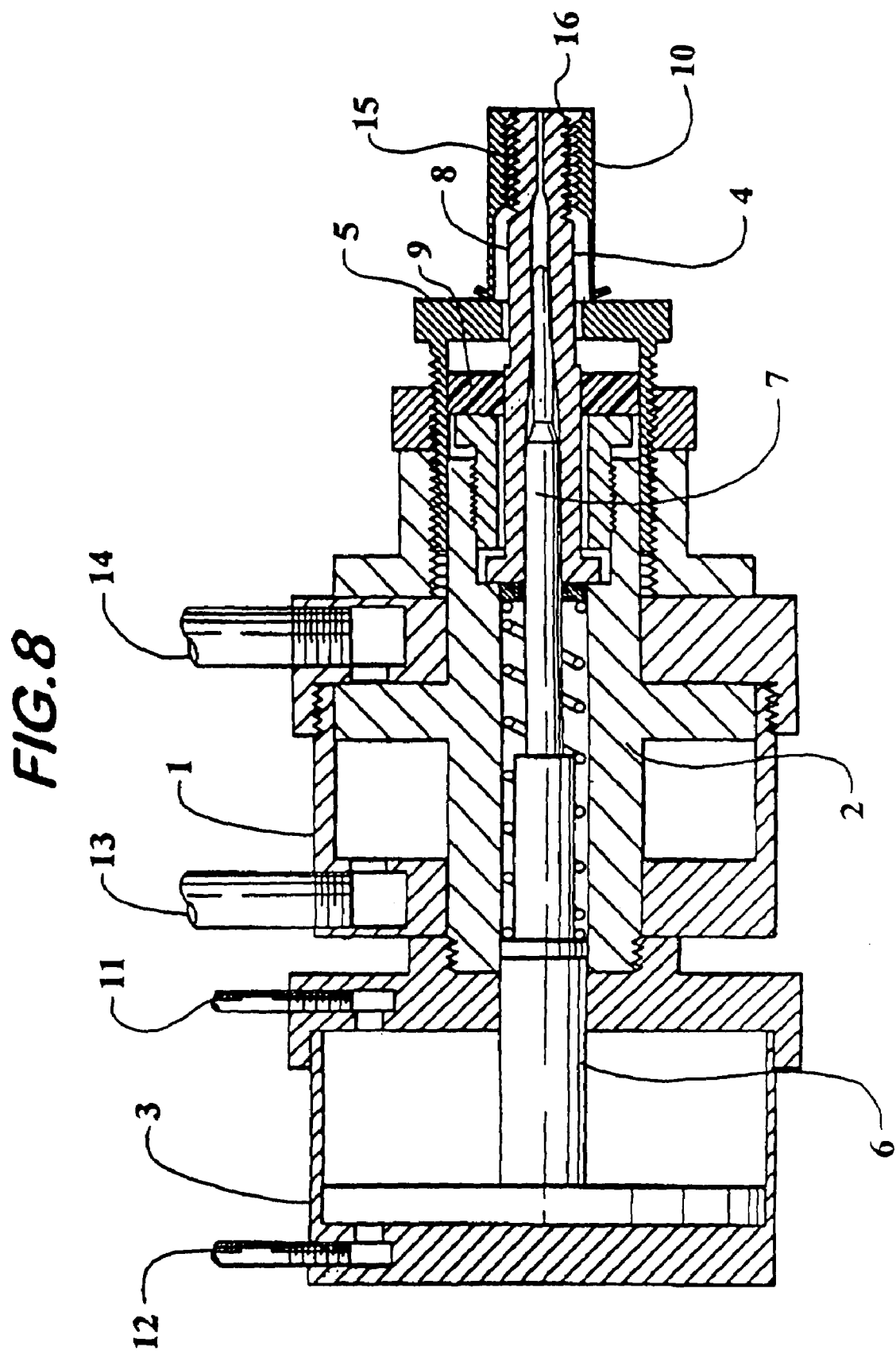
FIG. 8 is a partially cross-sectioned side view of the tool with the mandrel in the collapsed, fully extended state axially engaged with an insert.

In the preferred embodiment shown in FIG. 8 and following, the pulling force is applied with a double-acting pneumatic cylinder 1 which has a hollow cylinder rod 2. A second hydraulic cylinder 3 is attached to one end of the hollow cylinder rod 2. The expanding mandrel assembly 4 is attached to the opposite end of the hollow cylinder rod 2. The head support anvil 5 is adjustably attached to the body of the double acting pneumatic cylinder 1. The rod 6 of the second cylinder 3 is connected to a spreading pin 7, which is used to expand the segments 8 of the expanding mandrel. The pin includes a cylindrical portion and a substantially conical wedge surface at the forward tip. A garter assembly 9 forces the segments 8 of the expanding mandrel into the collapsed state when the spreading pin 7 is removed.

Figure 9:
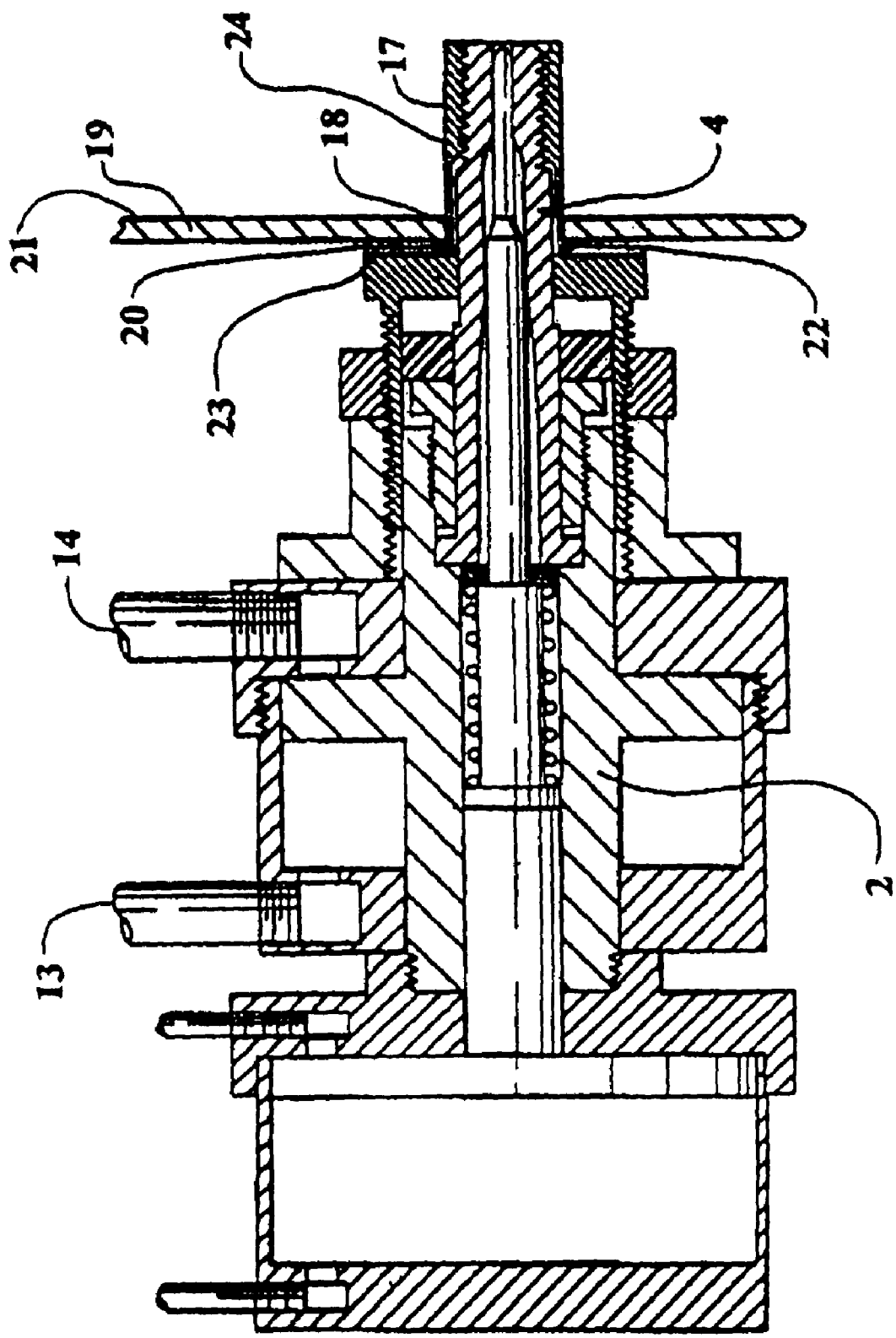
FIG. 9 is a partially cross-sectioned side view of the tool with the mandrel in the expanded, fully extended state and axially and radially engaged with an insert.

The sequence of operation of the preferred embodiment starts with the mandrel in the radially-collapsed and fully extended state as shown in FIG. 8. An insert 10 is in correct axial position, but is not yet in contact with the collapsed mandrel. To keep the mandrel in the collapsed position, fluid pressure is applied to port 11 and removed from port 12. The first action required is the expansion of the mandrel to engage the threads 15 of the insert 10 achieved by applying fluid pressure to port 12 and removing it from port 11. This pressurization causes the spreading pin 7 to move axially forward and the conical tip of the spreading pin wedges the mandrel segments 8 outwardly to the expanded state such that the thread-like portions of the mandrel segments 16 become engaged with the insert threads 15. The resulting position is shown in FIG. 9. It should be noted that a locked position is achieved by the cylindrical portion of the spreading pin which lies parallel to the surface of the inner walls of the segment, thereby achieving a direct block between opposing segments locking them in the expanded state without force feedback on the pin in the axial direction.

Since the mandrel is now engaged with the insert, the insert will move with the tool when the tool is moved. The next action in the sequence is to move the tool to the workpiece and to insert the insert body 17 in the hole 18 in the workpiece 19. After the insert has been installed completely so that the underside of the head 20 is in intimate contact with the outer surface 21 of the workpiece 19, the pulling action is initiated by applying air pressure to port 14 and removing it from port 13. This pressurization causes the hollow cylinder rod 2 to pull on the expanding mandrel assembly 4 moving insert head 22 against the head support anvil 23 of the tool nosepiece placing the counterbored area of the insert 24 in compression.

Figure 10:
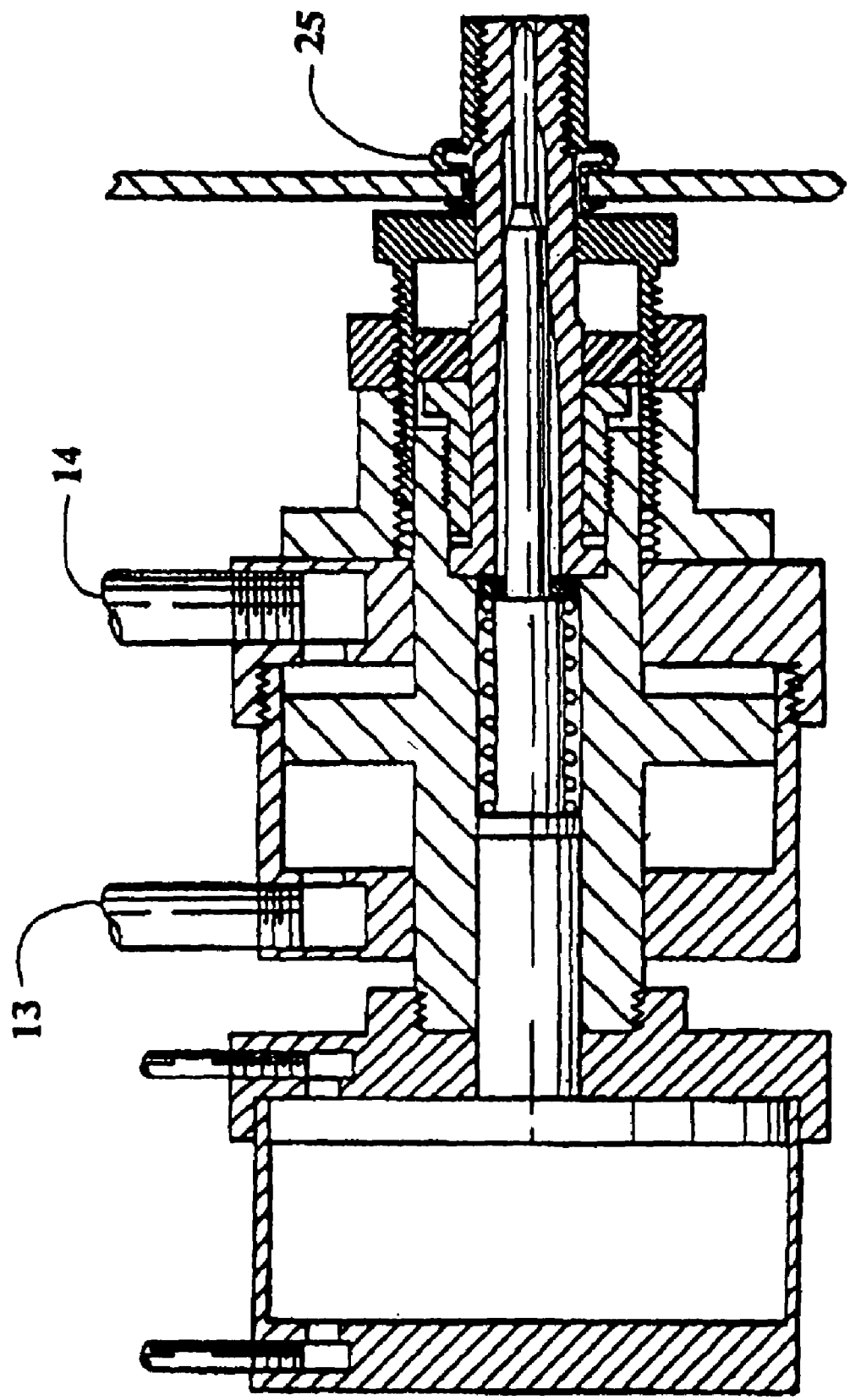
FIG. 10 is a partially cross-sectioned side view of the tool with the mandrel in the expanded state and axially at the stopping point with the fastener in the fully bulbed condition.

As shown in FIG. 10, the compressive load causes the thin-walled counterbored area to buckle outward creating a bulb 25 which captivates the insert to the workpiece. The pulling continues until it is ended by the tool control program which can be based on different factors. Pull-to-stroke tools pull until a predetermined stroke is achieved. Pull-to-force tools pull until a predetermined force is achieved. Tools using other control schemes pull until the control logic generates a stop signal. When the pulling is complete fluid pressure is removed from port 14 and port 13 causing the mandrel to hold its position regardless of how the tool is controlled.

Figure 11:
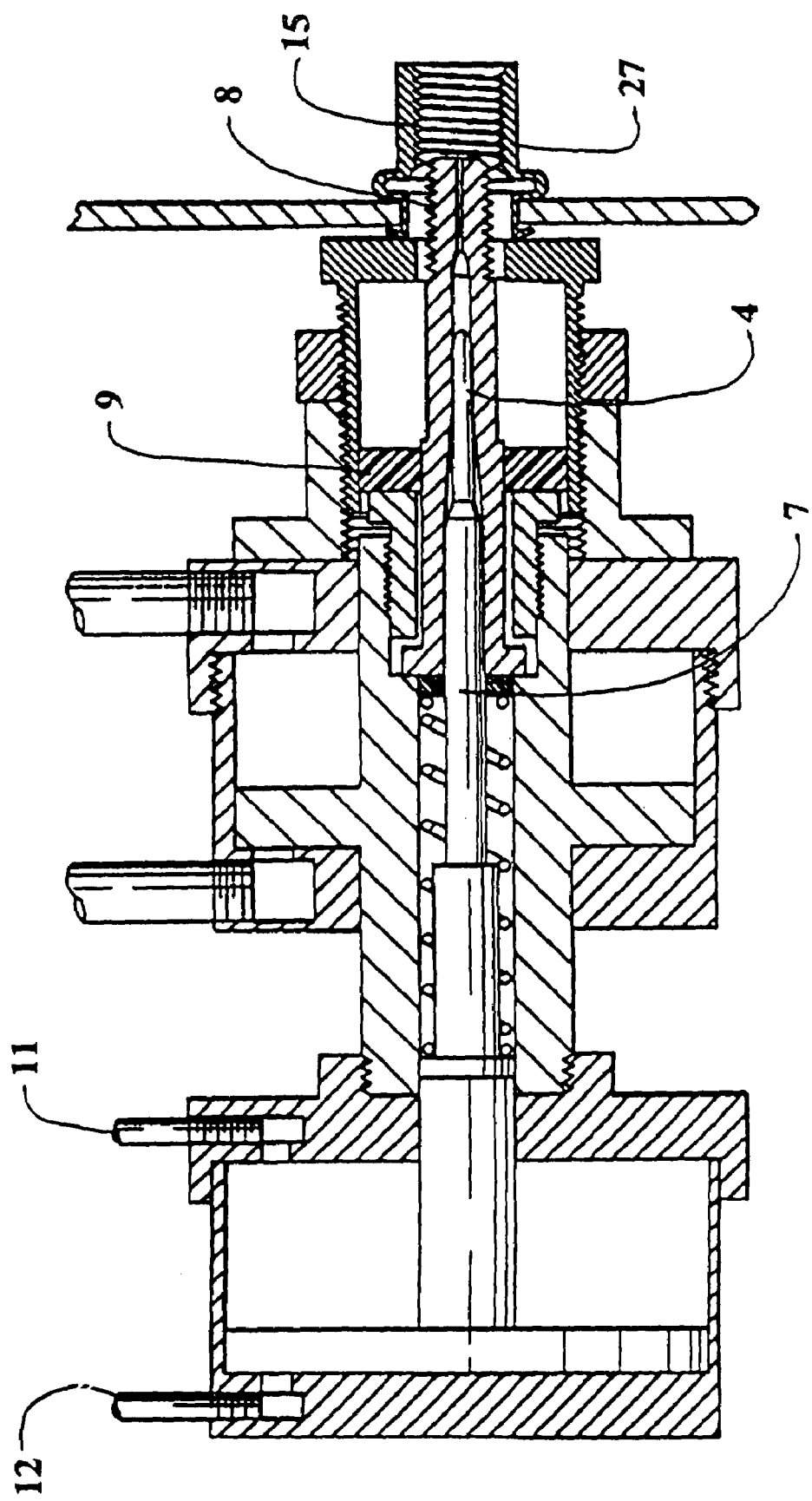
FIG. 11 is a partially cross-sectioned side view of the tool with the mandrel in the collapsed, retracted state, disengaged from the insert thread.

The next action in the operational sequence is the disengagement of the mandrel from the installed insert. This is accomplished in two steps, radial movement of the mandrel segments 8 followed by axial movement of the mandrel assembly 4. The radial movement is initiated by applying fluid pressure to port 11 and removing it from port 12. This pressurization causes the spreading pin 7 to move axially backward and retract from between the mandrel segments 8 allowing the garter assembly 9 to force the mandrel segments to the collapsed state around the smaller diameter cylindrical portion of the pin. This disengages the segments from the insert threads 15. The tool can now be moved axially away from the installed insert 27. The resulting final position is shown in FIG. 11.

In choosing the dimensions of the expanding mandrel, the thread minor diameter must be used as the outer diameter for area calculations. This differs from the tensile stress area diameter normally used, which is larger, nearly equal to the pitch diameter. The minor diameter must be used because the slotting of the mandrel cuts through the thread helix so that there is no longer any additive strength from the helix. The slot width and number of segments must be arranged so that when the mandrel is in the fully collapsed position, it will pass through the minimum minor diameter of the internal thread. As the number of segments is increased, the combined area of all the sections and therefore the strength of the assembly increases. However, experimentation has shown that, starting with four segments, the incremental strength increase from additional segments significantly decreases and beyond eight segments the incremental increase is negligible. Therefore, the preferred embodiment uses four segments.

The preferred embodiment described above can be applied equally well to a hand-held tool or to an automated tool. Other embodiments are also possible and are anticipated within the scope of this invention. Specifically, other embodiments using different means to actuate the mandrel between the expanded, locked and collapsed states can be made as can other embodiments using different means to actuate the mandrel between the fully extended state and the stopping point. Therefore, it will be apparent to those of skill in the art that there may be many other embodiments which will become apparent from the teachings herein. It should be understood, however, that the spirit and scope of the invention is to be defined only by the following claims and their legal equivalents.

What is claimed is:

1. A blind threaded insert installation tool, comprising:
    a body having a nosepiece;
    the nosepiece including an insert head support anvil having an expandable mandrel assembly projecting forwardly therefrom for engaging a fastener insert having an internally-threaded bore and compressing it against said anvil;

the expandable mandrel assembly comprising an elongate mandrel rod having an internal axial bore and helical threads along an outside surface thereof matching the internal threads of said insert, said mandrel with means for moving said mandrel rod radially from a collapsed state to an expanded state; and means for extending forward and retracting backward said mandrel rod assembly from said anvil and for moving said mandrel rod to a fully extended position.

2. The tool of claim 1 wherein said mandrel rod is radially segmented comprising a plurality of radially movable segments.

3. The tool of claim 2 wherein said means for moving said mandrel rod from the collapsed state to the extended state lies within the axial bore of the mandrel rod.

4. The tool of claim 3 wherein said means for moving said mandrel rod between the collapsed and expanded states is an axially movable spreading pin including a substantially conical wedge surface engageable with inner walls of said mandrel rod segments.

5. The tool of claim 4 further including means for resiliently biasing said mandrel rod segments toward the collapsed state.

6. The tool of claim 5 wherein means for extending and retracting said rod from the anvil is a pneumatic cylinder.

7. The tool of claim 6 wherein the number of mandrel rod segments is four.

8. The tool of claim 5 wherein said means for resiliently biasing said segments toward the collapsed state is a garter assembly.

9. The tool of claim 8 wherein the means for axially moving said spreading pin is a hydraulic cylinder.

10. The tool of claim 4 further including actuator means for moving said spreading pin forward and backward.

11. The tool of claim 2 including a plurality of axially extending radial slots lying between each mandrel segment.

12. The tool of claim 9 wherein said spreading pin includes a cylindrical wall portion engageable with said segments for locking said segments in the expanded state whereby an inward radial force applied to the mandrel rod segments does not cause an axial force on said spreading pin.

13. The tool of claim 1 further including means to adjust the axial position of the anvil relative to the mandrel rod when it is in its fully extended position.

14. A blind threaded insert installation tool, comprising:
a body having a nosepiece and an internally threaded insert engaged therewith;

the nosepiece including an insert head support anvil having an expandable mandrel assembly projecting forwardly therefrom for engaging the fastener insert and compressing it against said anvil;

the expandable mandrel assembly comprising an elongate mandrel rod having an internal axial bore and helical threads along an outside surface thereof matching the internal threads of said insert, said mandrel with means for moving said mandrel rod radially from a collapsed state to an expanded state; and means for extending forward and retracting backward said mandrel rod assembly from said anvil and for moving said mandrel rod to a fully extended position.

* * * * *